(12) United States Patent
Warboys et al.

(10) Patent No.: US 9,156,652 B1
(45) Date of Patent: Oct. 13, 2015

(54) SPEEDY WINCH ADAPTER

(71) Applicants: Alan R. Warboys, Washago (CA);
Rosemary Warboys, Washago (CA)

(72) Inventors: Alan R. Warboys, Washago (CA);
Rosemary Warboys, Washago (CA)

( * ) Notice: Subject to any disclaimer, the term of this patent is extended or adjusted under 35 U.S.C. 154(b) by 38 days.

(21) Appl. No.: 14/149,632

(22) Filed: Jan. 7, 2014

(51) Int. Cl.
*B65H 79/00* (2006.01)

(52) U.S. Cl.
CPC ........................................ *B65H 79/00* (2013.01)

(58) Field of Classification Search
CPC ............... Y10T 403/32467; Y10T 403/32483; Y10T 403/32508; Y10T 403/32516; F16B 7/10; B25B 13/32; B25B 13/58
USPC ................ 403/322.4, 109.1–109.8; 81/180.1; 254/376; 173/29, 132
See application file for complete search history.

(56) References Cited

U.S. PATENT DOCUMENTS

| | | | | |
|---|---|---|---|---|
| 1,156,065 A * | 10/1915 | Dixon | ......................... | 403/322.4 |
| 1,851,843 A * | 3/1932 | Inman | ........................... | 403/327 |
| 2,293,786 A | 8/1942 | Worden | | |
| 2,614,781 A * | 10/1952 | Engel | ............................. | 248/502 |
| 2,682,414 A * | 6/1954 | Richardson | ...................... | 279/77 |
| 3,090,600 A * | 5/1963 | Smith | ............................ | 410/151 |
| 4,362,415 A * | 12/1982 | Metz et al. | ................. | 403/109.3 |
| 4,867,595 A * | 9/1989 | Hoffman | ......................... | 403/13 |
| 6,308,786 B1 | 10/2001 | Bestgen | | |
| 6,478,503 B1 * | 11/2002 | Cheng | ......................... | 403/322.4 |
| 6,935,436 B1 * | 8/2005 | Williston | ......................... | 173/90 |
| 7,059,588 B2 | 6/2006 | Goulet | | |
| 8,820,714 B2 * | 9/2014 | Shih | .............................. | 254/126 |
| 2001/0045550 A1 * | 11/2001 | Reilly et al. | .................. | 254/376 |
| 2001/0047570 A1 * | 12/2001 | Lanz | .............................. | 16/429 |
| 2005/0186023 A1 * | 8/2005 | Lee | ............................. | 403/109.3 |

* cited by examiner

*Primary Examiner* — Daniel Wiley
(74) *Attorney, Agent, or Firm* — Crossley Patent Law

(57) ABSTRACT

A winch adapter including a unitary body having both a primary and a smaller secondary casing. A pair of levers, with handles, are pivotally attached to the secondary casing. A lug disposed on each lever opposite the handle is inserted through a hole in the primary casing and is maintained therein by tension from an associated elastic band against each lever, but the handle on each lever can be depressed to pull the lugs from their respective holes. The outer casing can then be inserted over a winch nipple with its own pair of holes, at which time, the handles would be released, causing the lugs to be inserted through holes on both the primary casing and the winch nipple. An air gun can then be used with the secondary casing and a drive on the secondary casing, allowing the air gun to rotate the winch adapter and the winch.

6 Claims, 4 Drawing Sheets

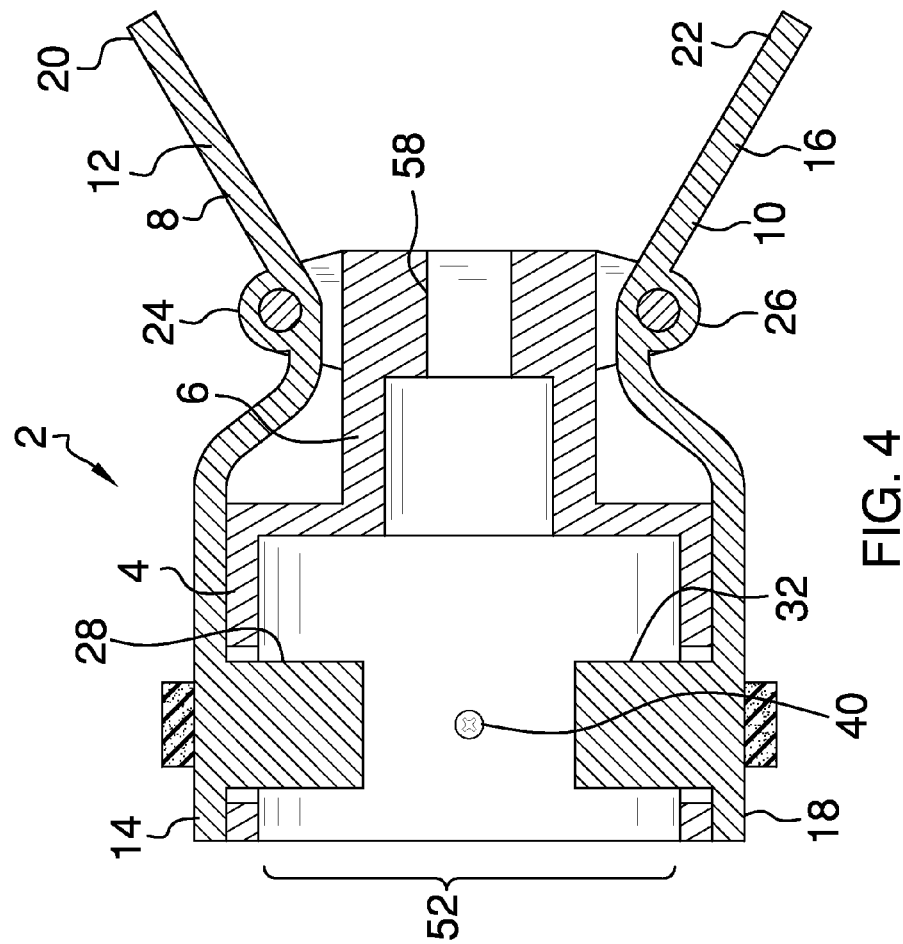
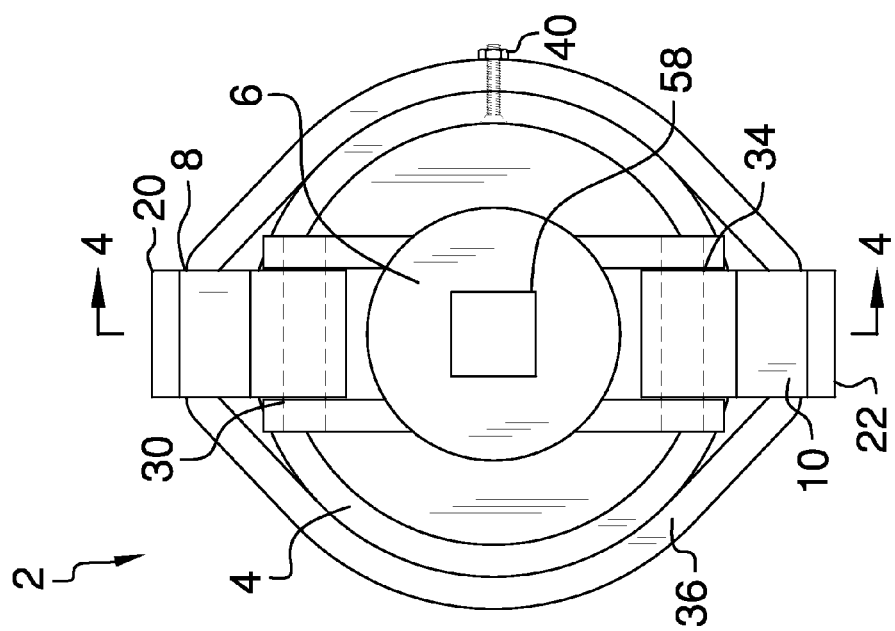
FIG. 4
FIG. 3

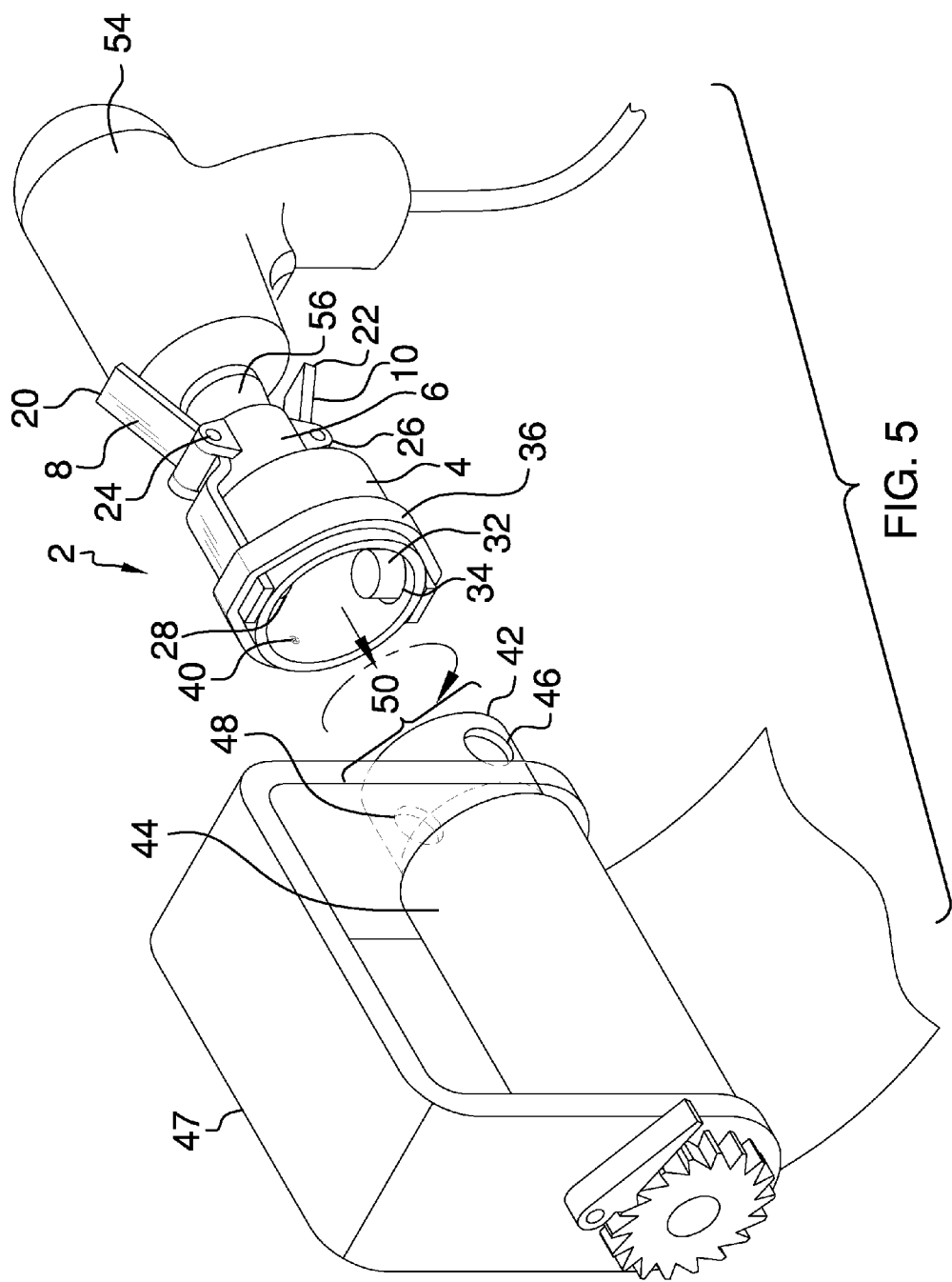

SPEEDY WINCH ADAPTER

BACKGROUND OF THE INVENTION

Various types of winch adapters are in use and are known in the prior art. However, what is needed is a winch adapter that is adaptable and easy to use, but at the same time, provide a strong structural connection between an item to be rotated and a hydraulic air gun, and these are characteristics that have not been utilized or conceived as shown in the present invention.

FIELD OF THE INVENTION

The present invention relates to a winch adapter, and more particularly, to a winch adapter that provides features and characteristics above and beyond existing winch adapters that are presently available today.

SUMMARY OF THE INVENTION

The general purpose of the present winch adapter, described subsequently in greater detail, is to provide a winch adapter which has many novel features that results in a winch adapter which is not anticipated, rendered obvious, suggested, or even implied by prior art, either alone or in combination thereof.

The present invention disclosed herein is a winch adapter that is fabricated from a primary casing and a smaller secondary casing that is attached to the primary casing. The primary casing and the secondary casing share the same axis of rotation. A pair of levers with incorporated handles are pivotally attached to the secondary casing, with the levers being attached 180 degrees apart from one another. The levers each have a handle on one end and a lug on the other end, with each lug being inserted through a hole in the primary casing. Each lug is normally kept inserted through its respective hole by tension from an associated elastic band, but the handles on each of the levers can be depressed to pull the lugs out of their respective holes. The outer casing can then be inserted over a winch nipple with its own pair of holes, at which time, the handles would be released. An air gun can then be used in association with the secondary casing and a appropriately sized drive on the secondary casing, allowing the air gun to rotate both the winch adapter and the winch.

Thus has been broadly outlined the more important features of the present winch adapter so that the detailed description thereof that follows may be better understood and in order that the present contribution to the art may be better appreciated.

BRIEF DESCRIPTION OF THE DRAWINGS

FIG. 3 is an end view of the speedy winch adapter.
FIG. 4 is a side cutaway view of the speedy winch adapter.
FIG. 5 is a perspective view of the speedy winch adapter shown as it would appear in use in conjunction with a winch and an air gun.

DETAILED DESCRIPTION OF THE DRAWINGS

Figure 1:
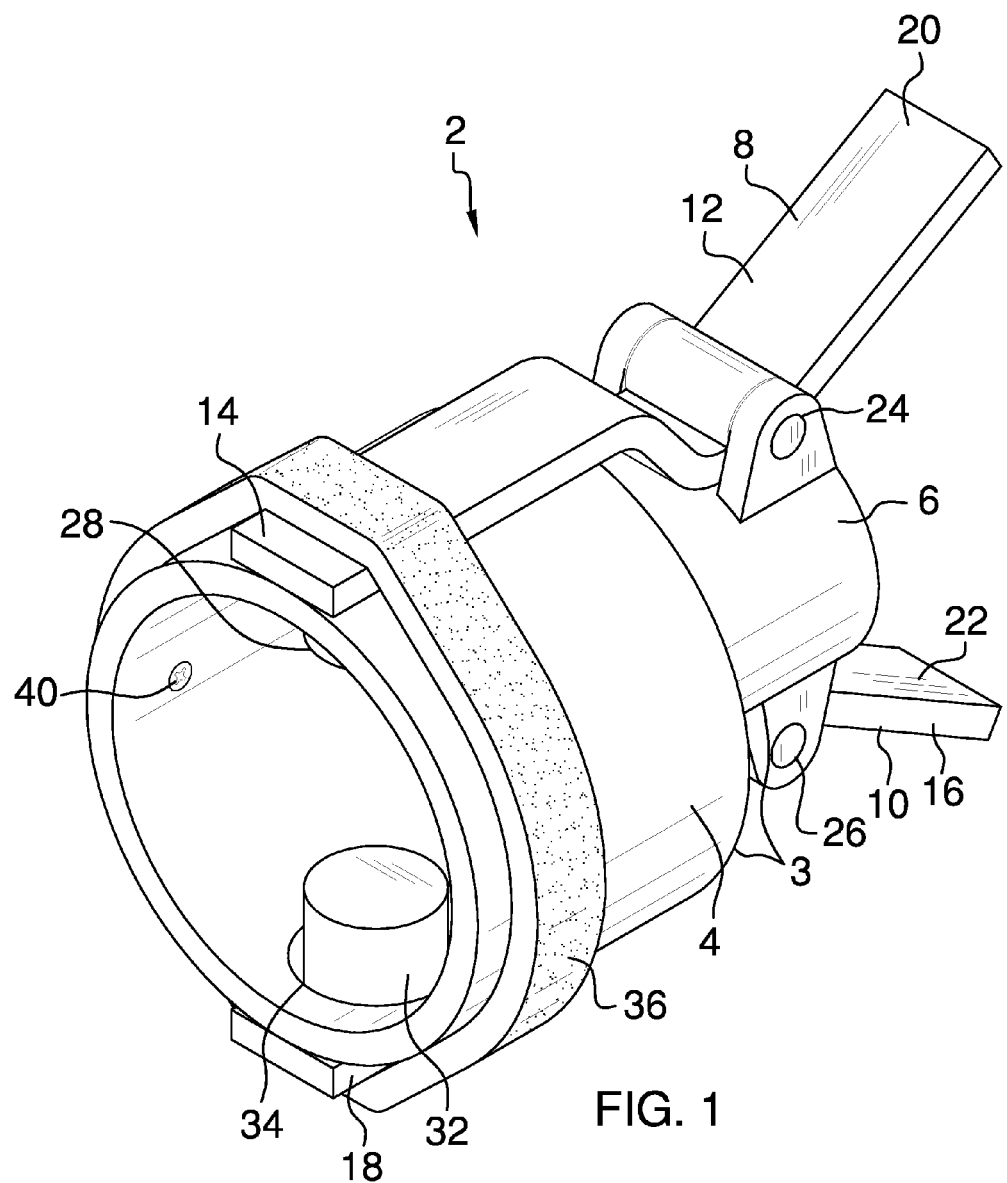
FIG. 1 is a perspective view of the speedy winch adapter.
Figure 2:
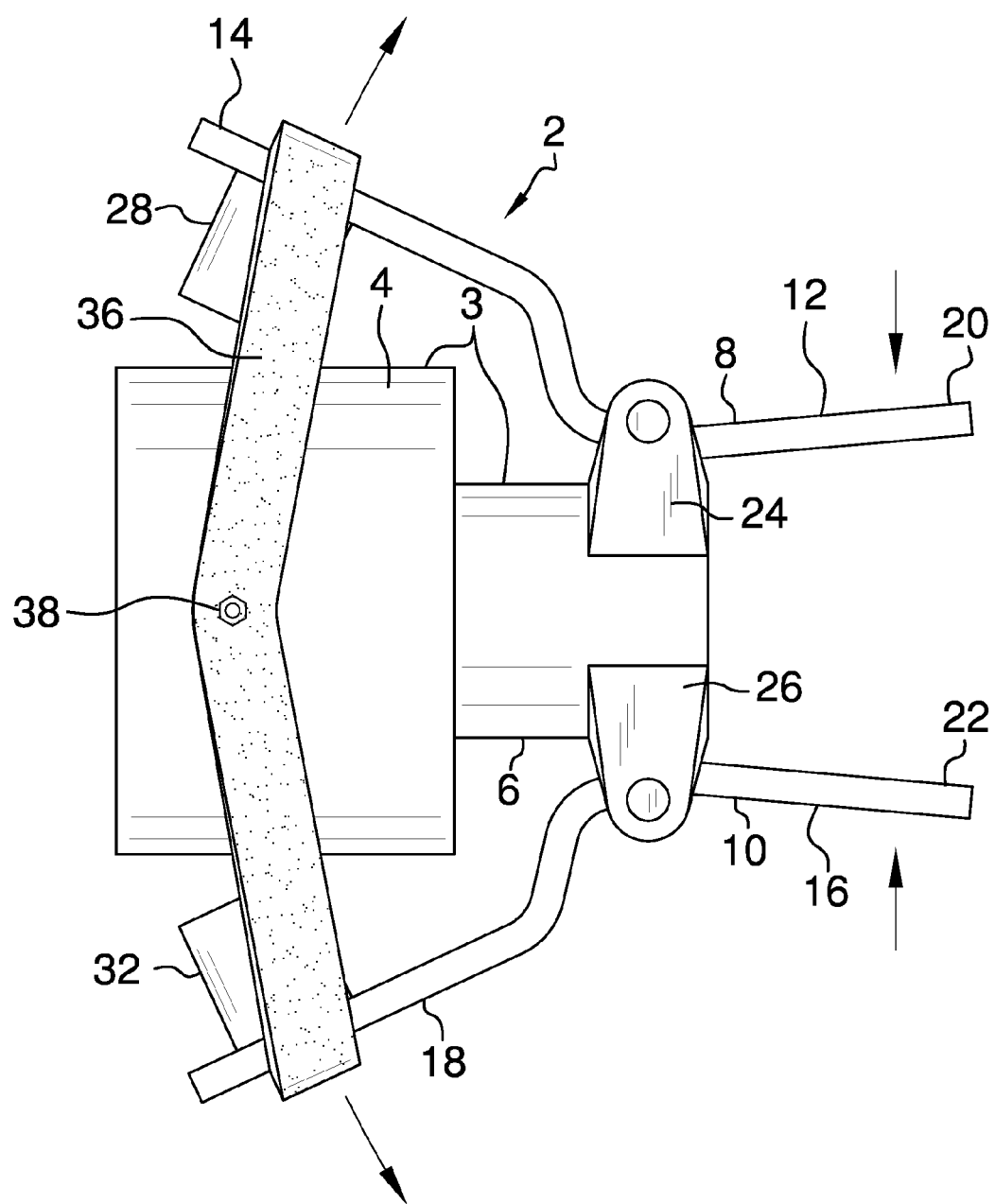
FIG. 2 is a side view of the speedy winch adapter.

With reference now to the drawings, and in particular FIGS. 1 through 5 thereof, an example of the speedy winch adapter employing the principles and concepts of the present invention and generally designated by the reference number 2 will be described.

Referring to FIGS. 1 through 5, a preferred embodiment of the present invention is disclosed. The speedy winch adapter 2 includes a unitary body 3. The unitary body 3 includes a primary casing 4 and a smaller secondary casing 6. The primary casing 4 and the secondary casing 6 are each cylindrical and share the same axis of rotation, with the secondary casing 6 having a smaller diameter than the primary casing 4.

A pair of levers 8 and 10 are pivotally attached to the secondary casing 6, with the levers being attached 180 degrees apart from one another. Lever 8 has two ends comprising a first end 12 and a second end 14, while lever 10 has two ends comprising a first end 16 and a second end 18. First end 12 of lever 8 has a handle 20, while first end 16 of lever 10 has a handle 22.

Lever 8 is pivotally attached to secondary casing 6 by pivot mechanism 24, while lever 10 is pivotally attached to secondary casing 6 by pivot mechanism 26.

The second end of each of the levers are flush with the primary casing 4 and are located 180 degrees apart from one another against the primary casing 4. The second end 14 of lever 8 has a lug 28 which is insertable through hole 30 on the primary casing 4, while the second end 18 of lever 10 has a lug 32 which is insertable through hole 34 on the primary casing 4. Each of the lugs 28, 32 are cylindrical. Hole 30 is located one hundred eighty degrees from hole 34.

Each of the second ends 14, 18 of the levers 8, 10 are kept flush against the primary casing 4 by an elastic band 36 that tightly encircles the second ends 14, 18 of the levers 8, 10 and the primary casing 4. The elastic band 36 is kept in place by a pair of fasteners 38, 40 that pass through both the elastic band 36 and the primary casing 4.

In use, a cylindrical winch nipple 42 attached to a winch 44 is inserted into the primary casing 4, with the cylindrical winch nipple 42 having a pair of holes 46, 48, that are located opposite one another by 180 degrees. The winch 44, as shown in FIG. 5, is connected to a flatbed trailer tie-down winch 47, but in reality, winch 44 could be used for other applications as well. The outer diameter 50 of the winch nipple 42 is equal to or very slightly less than the inner diameter 52 of the primary casing 4. At the same time, the handles 20, 22 are grasped and pushed in far enough that causes lugs 28, 32 to exit their respective holes 30, 34. Once hole 30 is aligned over hole 46 and hole 34 is aligned over hole 48, the handles 20, 22 can slowly be released, thereby allowing lug 28 to be inserted through both hole 30 and hole 46 and lug 32 to be inserted through both hole 32 and 48. This action serves to removably lock the winch nipple 42 to the speedy winch adapter 2.

Then, a user will utilize an air hammer 54 with an attached drive 56 with the secondary casing 6. The secondary casing 6 includes a hollowed-out square drive 58 that has the same shape as the drive 56 on the air hammer 54, thereby allowing insertion of the air hammer drive 56 into the drive 58 and utilization of the air hammer 54 to rotate the speedy winch adapter 2, which in turn will rotate the winch nipple 42 and the winch 44.

The invention claimed is:
1. A winch adapter in combination with a winch, the winch adapter comprising:
a unitary body including a primary casing and a secondary casing, the primary casing being cylindrical and having an inner diameter, the secondary casing being cylindrical;
a pair of levers comprising a first lever and a second lever;

wherein the first lever has two ends comprising a first end and a second end, wherein the first lever is pivotally attached to the secondary casing;

wherein the second lever has two ends comprising a first end and a second end, wherein the second lever is pivotally attached to the secondary casing;

wherein the first lever is pivotally attached to the secondary casing one hundred eighty degrees from the location the second lever is pivotally attached to the secondary casing;

a pair of handles comprising a first handle and a second handle, wherein the first handle is attached to the first end of the first lever; further wherein the second handle is attached to the first end of the second lever;

a first pair of holes comprising a first hole and a second hole, wherein each of the holes of the first pair of holes are located on the primary casing;

wherein each of the holes of the first pair of holes are located one hundred eighty degrees from each other;

a first pair of lugs comprising a first lug and a second lug, wherein each lug is cylindrical;

wherein the first lug is attached to the second end of the first lever and is insertable through the first hole of the first pair of holes, wherein the second lug is attached to the second end of the second lever and is insertable through the second hole of the first pair of holes;

an elastic band, wherein the elastic band encircles the primary casing; further wherein the elastic band forces the second end of the first lever against the primary casing; further wherein the elastic band forces the second end of the second lever against the primary casing;

a hollowed-out square drive disposed within the secondary casing, the drive configured to receive a tool for transmitting torque to the winch adapter;

a cylindrical winch nipple attached to the winch, the cylindrical winch nipple having an outer diameter;

a second pair of holes comprising a first hole and a second hole, wherein each hole of the second pair of holes is located on the cylindrical winch nipple, further wherein the first hole of the second pair of holes is located one hundred eighty degrees from the second hole of the second pair of holes;

wherein each of the handles of the pair of handles are grasped and pushed in, thereby causing each of the lugs of the pair of lugs to exit their respective holes;

further wherein the cylindrical winch nipple is inserted into the primary casing;

further wherein the first hole of the first pair of holes on the primary casing is aligned over the first hole on the second pair of holes on the cylindrical winch nipple;

further wherein the second hole of the first pair of holes on the primary casing is aligned over the second hole on the second pair of holes on the cylindrical winch nipple;

further wherein the pair of handles are released, thereby allowing the first lug to be inserted through the first hole of the first pair of holes on the primary casing and the first hole on the second pair of holes on the cylindrical winch nipple, further thereby allowing the second lug to be inserted through the second hole of the first pair of holes on the primary casing and the second hole on the second pair of holes on the cylindrical winch nipple.

2. A winch adapter in combination with a winch according to claim 1 wherein the winch adapter further comprises:

a pair of pivot mechanisms comprising a first pivot mechanism and a second pivot mechanism;

wherein the first pivot mechanism is located on the secondary casing, further wherein the first lever is pivotally attached to the secondary casing via the first pivot mechanism;

further wherein the second pivot mechanism is located on the secondary casing, further wherein the second lever is pivotally attached to the secondary casing via the second pivot mechanism.

3. A winch adapter in combination with a winch according to claim 2 wherein each of the levers of the pair of levers is flush with the primary casing.

4. A winch adapter in combination with a winch according to claim 3 wherein the winch adapter further comprises:

a pair of fasteners comprising a first fastener and a second fastener;

wherein each fastener is inserted through the elastic band and the primary casing.

5. A winch adapter in combination with a winch according to claim 4 wherein the outer diameter of the cylindrical winch nipple is slightly less than the inner diameter of the primary casing.

6. A winch adapter in combination with a winch, the winch adapter comprising:

a unitary body including a primary casing and a secondary casing, the primary casing being cylindrical and having an inner diameter, the secondary casing being cylindrical;

a pair of levers comprising a first lever and a second lever;
wherein the first lever has two ends comprising a first end and a second end, wherein the first lever is pivotally attached to the secondary casing;

wherein the second lever has two ends comprising a first end and a second end, wherein the second lever is pivotally attached to the secondary casing;

wherein the first lever is pivotally attached to the secondary casing one hundred eighty degrees from the location the second lever is pivotally attached to the secondary casing;

wherein each of the levers of the pair of levers is flush with the primary casing;

a pair of pivot mechanisms comprising a first pivot mechanism and a second pivot mechanism, wherein the first pivot mechanism is located on the secondary casing, further wherein the first lever is pivotally attached to the secondary casing via the first pivot mechanism, further wherein the second pivot mechanism is located on the secondary casing, further wherein the second lever is pivotally attached to the secondary casing via the second pivot mechanism;

a pair of handles comprising a first handle and a second handle, wherein the first handle is attached to the first end of the first lever; further wherein the second handle is attached to the first end of the second lever;

a first pair of holes comprising a first hole and a second hole, wherein each of the holes of the first pair of holes are located on the primary casing; wherein each of the holes of the first pair of holes are located one hundred eighty degrees from each other;

a first pair of lugs comprising a first lug and a second lug, wherein each lug is cylindrical;

wherein the first lug is attached to the second end of the first lever and is insertable through the first hole of the first pair of holes, wherein the second lug is attached to the second end of the second lever and is insertable through the second hole of the first pair of holes;

an elastic band, wherein the elastic band encircles the primary casing; further wherein the elastic band forces the second end of the first lever against the primary casing; further wherein the elastic band forces the second end of the second lever against the primary casing;

a pair of fasteners comprising a first fastener and a second fastener, wherein each fastener is inserted through the elastic band and the primary casing;

a hollowed-out square drive disposed within the secondary casing, the drive configured to receive a tool for transmitting torque to the winch adapter;

a cylindrical winch nipple attached to the winch, the cylindrical winch nipple having an outer diameter, wherein the outer diameter of the cylindrical winch nipple is slightly less than the inner diameter of the primary casing;

a second pair of holes comprising a first hole and a second hole, wherein each hole of the second pair of holes is located on the cylindrical winch nipple, further wherein the first hole of the second pair of holes is located one hundred eighty degrees from the second hole of the second pair of holes;

wherein each of the handles of the pair of handles are grasped and pushed in, thereby causing each of the lugs of the pair of lugs to exit their respective holes;

further wherein the cylindrical winch nipple is inserted into the primary casing;

further wherein the first hole of the first pair of holes on the primary casing is aligned over the first hole on the second pair of holes on the cylindrical winch nipple;

further wherein the second hole of the first pair of holes on the primary casing is aligned over the second hole on the second pair of holes on the cylindrical winch nipple;

further wherein the pair of handles are released, thereby allowing the first lug to be inserted through the first hole of the first pair of holes on the primary casing and the first hole on the second pair of holes on the cylindrical winch nipple, further thereby allowing the second lug to be inserted through the second hole of the first pair of holes on the primary casing and the second hole on the second pair of holes on the cylindrical winch nipple.

\* \* \* \* \*